United States Patent Office

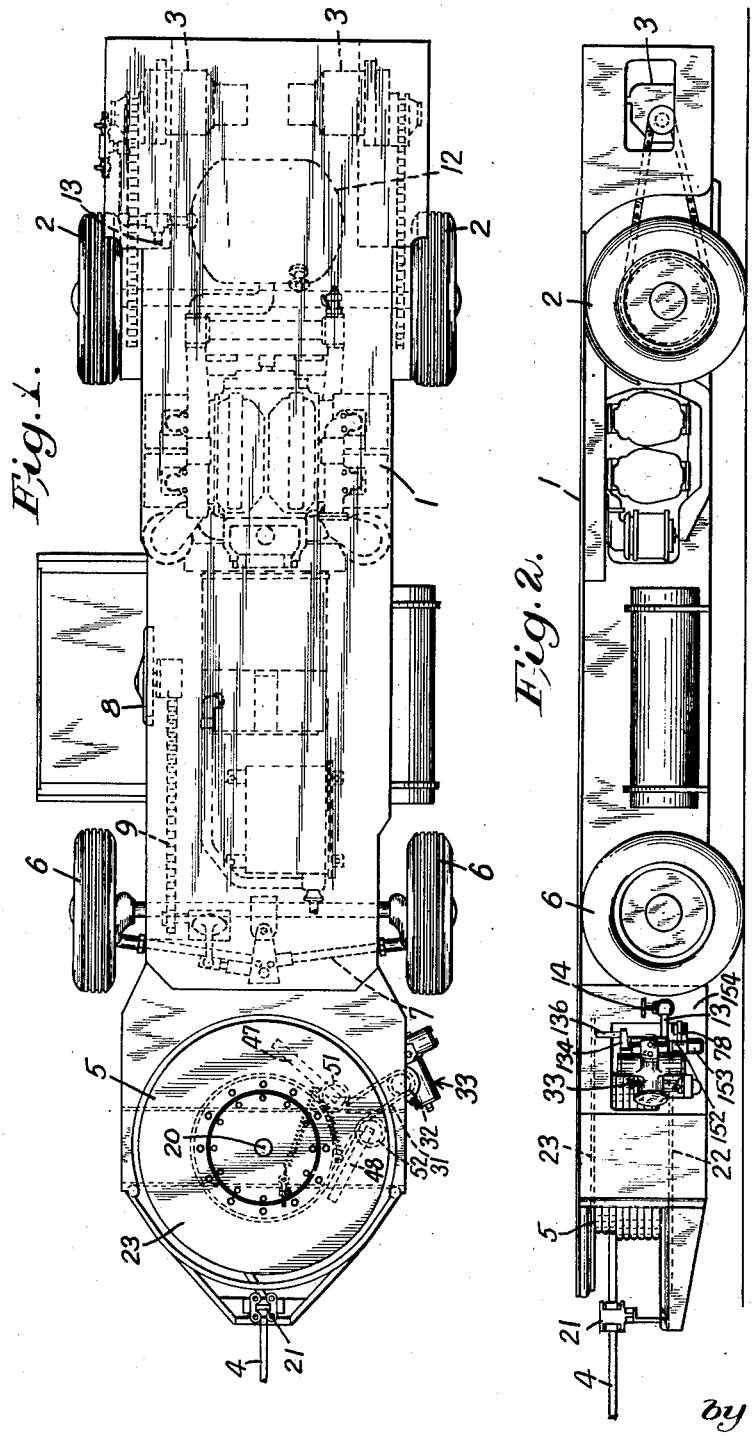

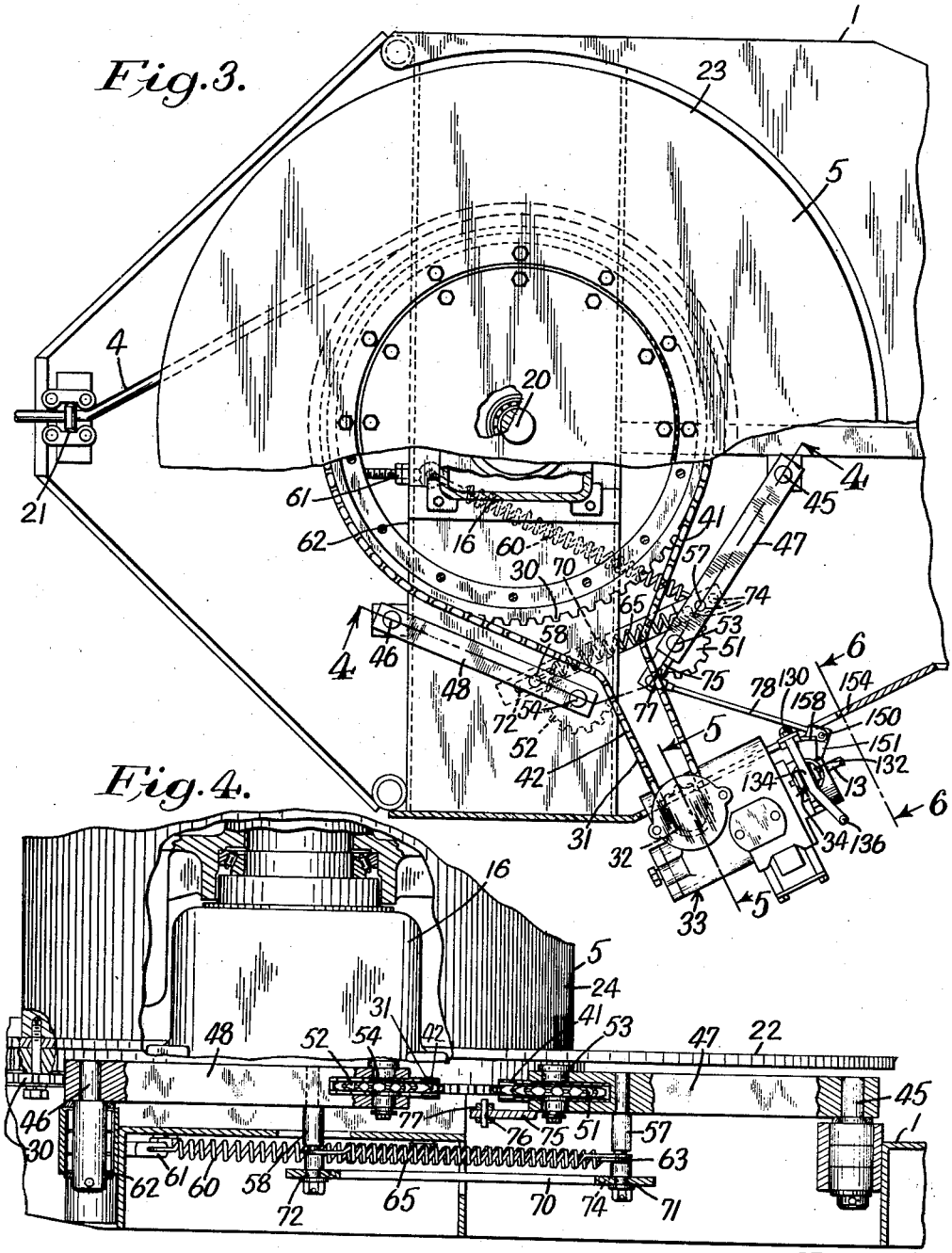

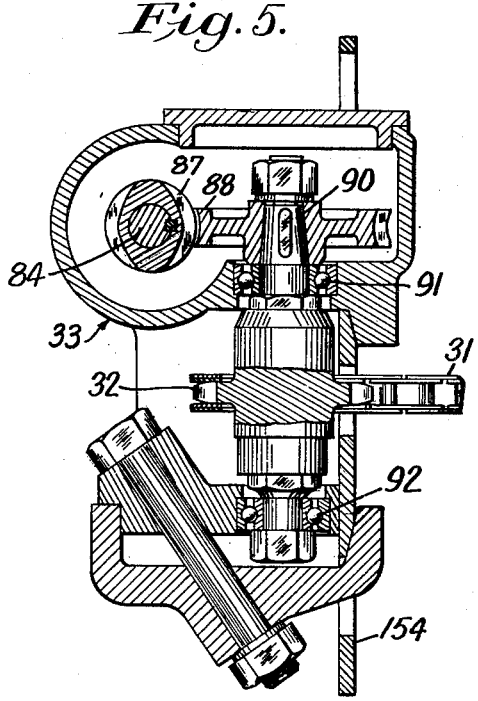
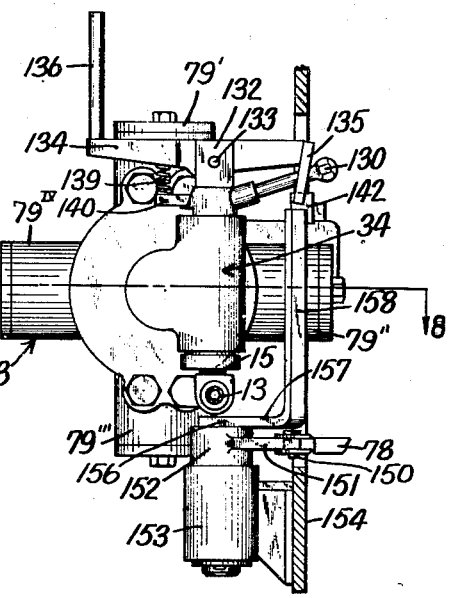

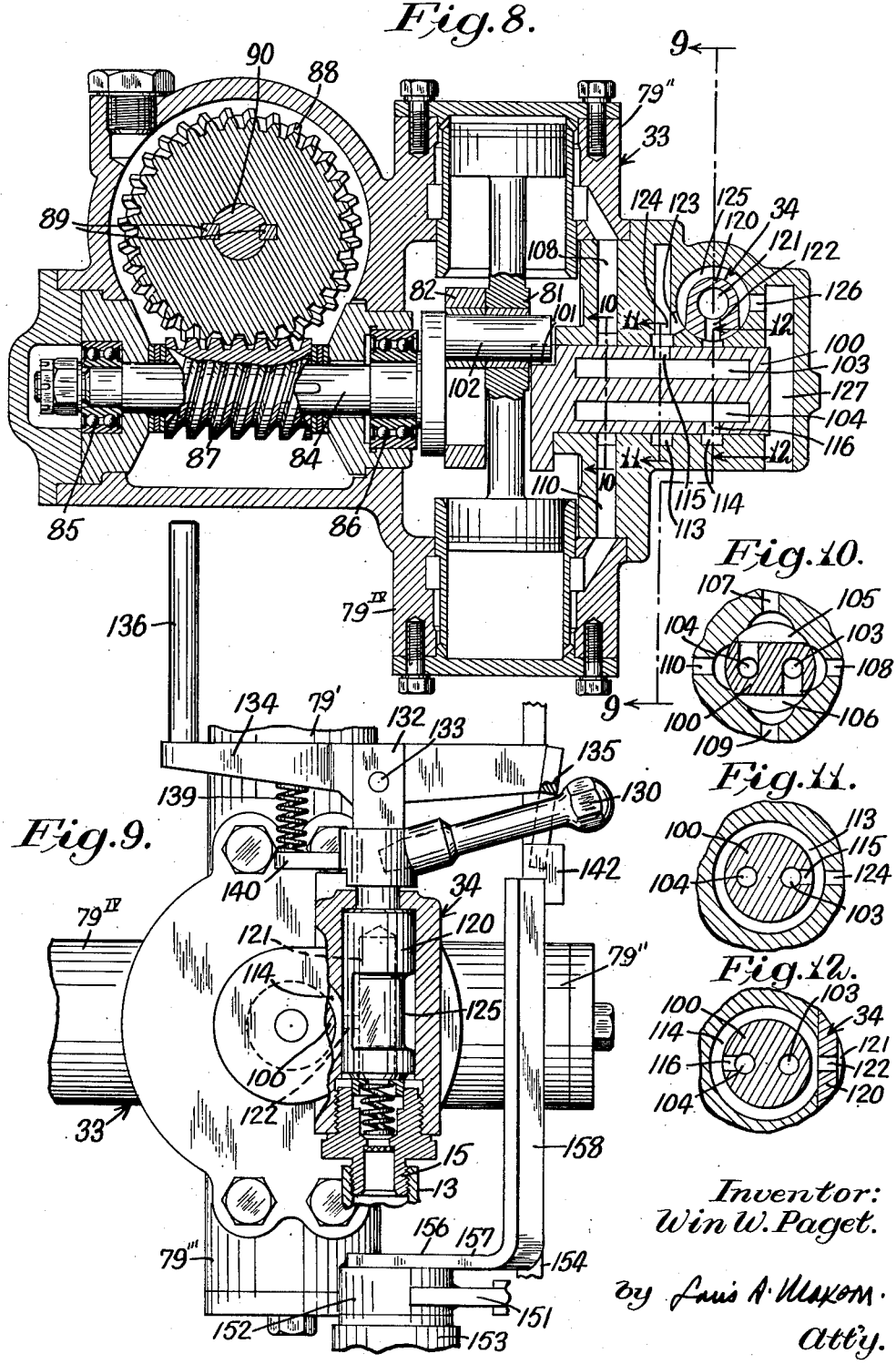

2,707,598
Patented May 3, 1955

2,707,598

CABLE REEL CONTROL FOR SELF-PROPELLED VEHICLES

Win W. Paget, Mountain Brook, Ala., assignor to Joy Manufacturing Company, Pittsburgh, Pa., a corporation of Pennsylvania Application March 16, 1951, Serial No. 215,936

18 Claims. (Cl. 242—90)

This invention relates primarily to improvements in apparatus for winding in and effecting paying out of flexible conductors for operating medium used to effect the propulsion, and/or other functions, of mine vehicles, and it relates more particularly to a drive for a cable reel on which there is wound the cable by which power is supplied to a selfpropelled vehicle such as a mobile compressor, a shuttle car, a mine locomotive, or the like, which drive and control apparatus includes a reversible motor, a reversing value for the latter, and controlling means for the position of the reversing valve governed by the tension of the cable.

With reeling devices of the character mentioned, it is important that they shall be usable not only to wind up the cable when moving toward the point of connection of the latter to a source of power, and to permit the drawing off of such cable when moving away from such connection, but also that when they are moved in courses or paths which will occasion a need for automatic shifting from a winding in to a paying out, or from a paying out to a winding in operation, they shall automatically effect such shiftings. It is also important that when the paying out of cable ceases, there shall be an automatic repositioning of parts so that there may be no possibility of the cables being run over, and also to forestall an accumulation of slack in the cable which might interfere with its smooth winding. It is therefore important to maintain some tension on the cable even during times when it is being pulled off of the reel. A very desirable arrangement for accomplishing the objectives enumerated includes a reversible fluid pressure operated motor, having connections with a cable reel such that neither the motor nor the cable reel can have substantial rotation of it occur while the other is stationary, together with a reversing valve for the motor and means governed by the tension of the cable for controlling the position of the reversing valve, or, specifically, the control of the reversing valve may desirably be accomplished by variations in the tension of a run of a flexible driving member extending between the motor and the reel. From what has been said, the objects of the invention will be clearly apparent. Broadly, it may be stated that these include a provision of an improved expansible chamber motor operated cable reel driving and controlling apparatus, and more specifically the provision of such an apparatus having the control thereof effected by a reversing valve shiftable to cause the supply of fluid to the motor to cause its selective rotation in opposite directions and adjustable under the control of the tension of the cable, and desirably through the tension of a flexible connection between the motor and the reel, to control the magnitude of the torque exerted by the motor on the reel and the direction of the torque, in terms of reel rotation. Other objectives and advantages of the invention will hereinafter more fully appear.

In the accompanying drawings, in which, for purposes of illustration, one embodiment which the invention may assume in practice is shown:

Fig. 1 is a plan view in simplified form of a vehicle in which the invention is incorporated.

Fig. 2 is a side view of the vehicle shown in Fig. 1.

Fig. 3 is an enlarged plan view with parts broken away showing the improved reel drive and control mechanism.

Fig. 4 is a view on a further enlarged scale on the planes of the section line 4—4 of Fig. 3, showing details of the control mechanism, certain parts being omitted.

Fig. 5 is a further enlarged vertical detail section, on the plane of the line 5—5 of Fig. 3.

Fig. 6 is a view on the plane of the line 6—6 of Fig. 3.

Fig. 7 is an elevational view of the structure of Fig. 6, as viewed from the right side of Fig. 6.

Fig. 8 is a horizontal sectional view on a still larger scale, being taken on the plane of the line 8—8 of Fig. 6 and turned 90° to the left.

Fig. 9 is a view partially in elevation, and partially in section on the plane of the line 9—9 of Fig. 8, showing a detail of the control mechanism, parts being broken away to illustrate certain details of construction.

Fig. 10 is a section on the plane of the line 10—10 of Fig. 8, showing a detail of the fluid distribution valve of the reversible motor, above mentioned.

Figs. 11 and 12 are sections on the planes of the line 11—11 and 12—12 of Fig. 8, showing details of construction of the reverse mechanism.

Referring now to the drawings, it will be noted that the invention is incorporated in a vehicle 1 clearly shown as having drive wheels 2—2 separately driven by motors 3—3. The motors 3—3 may be electric motors, and power may be supplied to these motors by a flexible conductor cable 4 wound on a drum 5. The means for connecting the portion of the cable wound on the drum with the motors may be of any conventional variety, and since many such arrangements are known to the art, no illustration is necessary. The vehicle also has steerable wheels 6—6, the position of which is controlled by a steering linkage arrangement 7 controllable by a steering wheel 8 and a chain and gear drive connection 9. The details of this mechanism also need not be described as they do not affect the particular improvement of the present invention and might assume many forms. The vehicle illustrated is shown mainly in outline and may desirably support an air pump and a driving motor therefor, and these are shown in dotted lines in Fig. 1, and so far as they are concerned, it will suffice to state that the pump or compressor discharges the fluid which it pumps to a receiver or air tank 12, herein shown as mounted on the end of the vehicle 1. This air tank or receiver is connected by a conduit 13, having a stop valve 14 therein, with a threaded connection 15 of which more will be said later. The reel 5 is journaled in any suitable manner upon the frame of the vehicle, and the means for rotatably supporting it is partially shown at 16, in Figs. 3 and 4. The reel is rotatable on a vertical axis 20 shown as located midway between the sides of the vehicle 1, and the conductor cable 4 passes off from the reel and through a cable guide 21 arranged midway between the sides of the vehicle and close to the reel 5.

The reel 5 includes flange portions 22 and 23 connected by a cylindrical portion 24 upon which the cable is wound, and the reel has fixed to it a large sprocket 30, the latter being arranged coaxial with the reel. The sprocket 30 is connected by an endless drive chain 31 of any suitable construction with a smaller sprocket 32 which is driven, as will shortly be explained, by a reversible expansible chamber motor 33. The motor 33 is provided with a control valve device 34 which is adapted to control not only the rate of fluid supply to the motor, but also to control the fluid supply in such a manner as to effect reverse operation of the motor. The endless drive chain 31 does not extend directly between the sprockets 30 and 32 along straight lines tangential to both of the sprockets, but instead has a certain amount of slack as shown in Fig. 3, so that, under certain conditions, the portions of the chain tangential to the large sprocket 30 may make substantial angles to the portions of the chain tangential to the small sprocket 32. These angles, which are obtuse angles, may be at least substantially like angles when there is no tension exerted on the chain 31, either by the motor 33 or by the cable 4, or there may be an approach of one of the runs of chain between the sprockets toward a straight line, while the other run has its component parts make smaller angles with each other. For ease of reference, although it will be appreciated that the lengths of the runs mentioned are not constant, one of these runs will be designated 41 and the other designated 42. It may be noted at this time that it will shortly become apparent that the run 41 is the one which transmits power from the motor 33 to the reel 5, to effect winding in of the cable 4.

The frame of the vehicle supports, on suitably journaled vertical stub shafts 45 and 46, the more remote ends of a pair of horizontal swingable arms 47 and 48. Each of these arms has suitably journaled on it a sprocket engaging one of the runs 41—42. Herein the arm 47 carries a sprocket 51 engaging the run 41. The arm 48 carries a sprocket 52 engaging the run 42. Sprocket 51 is journaled at 53 on the end of the arm 47, remote from the stub shaft 45. The sprocket 52 is journaled as at 54 on the end of the arm 48 remote from the stub shaft 46. The arm 47 has depending from it a pin element 57, arranged near the sprocket 51. The arm 48 has a pin element 58 depending from it at a point near the sprocket 52. A relatively heavy spring 60 is connected at one end through adjustable attachment means 61, mounted in a flange 62 on the body of the vehicle 1, with a stationary point on the vehicle. The other end of the spring 60 is connected with the pin 57 as at 63. A second spring 65 extends between the pins 57 and 58, and is under tension, and normally constantly maintains the distance between the sprockets 51 and 52 at the minimum possible under existing conditions. The spring 60 normally swings the arm 47 to move the sprocket 51 as far toward the axis 20 as possible. The degree to which it may effect this swinging is determined by the tension in the run 41 of the chain 31. A link 70 is pivotally connected at 71 to the bottom of the pin 57, and its other end has a sliding and pivotal connection through a slot 72 with the lower end of the pin 58. The link 70 may desirably be provided with a plurality of openings 74 so that it may be connected at different points with the pin 57. This adjustability, as well as the slot 72, is of primary importance in providing for variations in dimensions of the constituent parts of the apparatus. The arm 47 has suitably secured to it at its swingable end an extension 75 to which there is pivotally connected at 76, a fork element 77 associated with a link 78, which will shortly be further described. The motor 33 may assume any desired and appropriate form, and any air motor of appropriate power, and capable of reversal by reversing the connection of its supply and exhaust passages with supply and exhaust lines, may be used in place of the particular structure illustrated, within the broader aspects of my invention. Indeed, a reversible electric motor, particularly if supplied with appropriate rheostat means, might be used to perform the functions of the motor 33.

The motor 33 is herein illustrated as of the four cylinder, Scotch yoke type, its cylinders being herein illustrated in elevation at 79$^I$, 79$^{II}$, 79$^{III}$ and 79$^{IV}$ in Fig. 6, and the two Scotch yokes being illustrated at 81 and 82 in Fig. 8. The crank shaft is illustrated at 84 and is journaled in suitable bearings 85 and 86, and carries a worm 87, which engages a worm wheel 88 suitably held as at 89 to a vertical shaft 90, which is in turn supported in bearings 91, 92, and which carries between said bearings the sprocket 32. The motor 33 has a distributing valve 100 connected as at 101 with the crank pin 102 of the motor, and the distributing valve has passages 103 and 104 extending longitudinally through it and opening into grooves 105 and 106 in its periphery which serve to distribute fluid relative to portings 107, 108, 109 and 110 leading to the outer ends of the cylinders 79$^I$, 79$^{II}$, 79$^{III}$ and 79$^{IV}$.

The distributing valve is surrounded by annular grooves 113 and 114, and the passage 103 communicates constantly through a radial port 115 with the groove 113, while the passage 104 is connected constantly by a radial port 116 with the annular groove 114. The groove 113 and the groove 114 are alternatively connected with fluid supply and with fluid exhaust, under the control of the reversing valve 34, which includes, as shown, a rotating, generally cylindrical valve 120 having a central fluid supply passage 121 connected through the interior of the valve with the fluid supply connection 13, and adapted to be connected through a radial passage 122 selectively with the groove 114 or through stationary passages 123 and 124 with the groove 113. The valve member 120 has a peripheral arcuate groove 125 which is adapted alternatively to connect the grooves 113 and 114 with a stationary exhaust port 126, which communicates continuously with an exhaust passage 127.

The structure of the motor 33 will be readily understood from the description given, and the whole motor, to and including its reversing valve, may be of a type manufactured by my assignee and widely known as an MW-6 Air Motor, of which a large number are now in use.

The valve element 120 has an operating handle 130 secured to it, and this operating handle is adapted to be turned by mechanism, which will now be explained, or to be turned independently after the disconnection of such mechanism.

It may here be noted that the upper end of the valve element 120 has parallel ears 132, between which, upon a pivot pin 133, there is journaled a lever 134. This lever has a fork 135 at one end and a handle 136 at its other end. The lever is not straight from end to end, but this makes no material difference in its mode of operation. A spring 139 acting between one of the arms of the lever, and a projecting flange 140, also mounted on the valve 120, normally maintains the fork 135 in such a position that it brackets the handle 130 and receives between its lower ends a block 142 whose position is changed with changes in position of the arm 47. Obviously, by compressing the spring 139, it is possible to raise the fork 135 far enough so as to permit manual control of the handle 130 and so of the valve 120, even though there be provided an automatic control for the valve 120.

The link 78 has been previously described as controllable by the position occupied by the arm 47. This link is pivotally connected at 150 to an arm 151 secured to a hub portion 152 which is journaled for rotation in a bearing bracket 153 secured to a frame element 154 carried by the body 1. The hub portion 152 supports at its top a bent arm structure 156 including a radial portion 157 and an upright portion 158, to which the block 142 is welded. It will therefore be evident that as the link 78 moves to the right or to the left, the block 142 will be moved clockwise or counter-clockwise, and the valve 120 will be moved in Fig. 8 clockwise if the link 78 is moved to the right, and will be moved counter-clockwise if the link 78 is moved longitudinally to the left in Fig. 3. The position of the valve shown in Fig. 8 corresponds approximately to the position of the parts shown in Fig. 3, but it will, in any event, be evident that but little counter-clockwise motion of the valve 120 from the position shown in Fig. 8 will ever take place, while there may be substantial motion clockwise—a motion sufficient under some circumstances to bring the port 122 not only out of communication with the groove 114 but into communication with the groove 113, and to cut off connection of the latter groove with the exhaust while bringing the groove 114 into communication with the exhaust.

The mode of operation of the structure which has been described will be readily understood. Whether or not to provide a stop valve, as at 14, is optional, because if desired, the valve 120 may be disconnected from its automatic control means and moved to shut off all air supply to the motor 33.

Now let it be considered that the vehicle 1 is standing in a mine and that there is no tension on the cable 4— that there is slack in the cable. Under these circumstances the arm 47 will move to the furthest clockwise position to which it can attain, and the valve 120, being connected with the block 142, will occupy some such position as is shown in Fig. 8, although it may vary somewhat to either side of that position, depending upon fortuitous variations in the length of component parts of the apparatus. Now assume that air is supplied from the tank 12 to the hollow interior 121 of the valve 120, the fluid will then pass to the groove 114, through the radial passage 116, into the longitudinal passage 104, and into the groove 105, and be conducted to the cylinder 79¹. Therefore, the motor 33 viewed from the right end thereof in Fig. 8, will rotate in a clockwise direction, and accordingly the worm 87 will turn the shaft 90 clockwise in Fig. 8, and will cause the drum 5 to rotate in a clockwise direction through the exertion of traction on the run 41 of chain 31 by the sprocket 32. While there is slack in the cable 4, there will not be required much tension in the run 41 in order to effect reel rotation, and accordingly the angle between the portions of the run 41 at opposite sides of the sprocket 51 will not be much increased. However, there will be probably some straightening out of this run, and so the arm 47 will be swung counter-clockwise against the action of the spring 60, and the link 78 will be moved to the right in Fig. 3, and the valve 120 will be turned clockwise in Fig. 8 but not sufficiently to reduce materially the supply of fluid to the motor 33. Indeed, since the position of the arm 47 is not its maximum position toward the left, it is possible that the parts will do no more than move to the position shown in Figure 3, from the extreme leftward position of the arm 47. If the vehicle remains still, the slack in the cable will be soon taken up, and then the tension in the run 41 will become sufficient to move the arm 47 a substantial distance counter-clockwise about the pivot of the stub shaft 45, and accordingly the valve 120 will shut off most of the air going to the air motor 33. Indeed, the valve 120 may be thought of as just supplying enough air to the motor 33 to maintain the desired tension in the cable 4. Now if the vehicle 1 starts to move away from the point of connection of the cable 4, there will be an increased tension on the cable, and so the arm 47 will be moved further in a counter-clockwise direction, and this will cause the valve 120 to rotate further in a clockwise direction—far enough to bring the passage 122 into communication with the groove 113—and the exhaust groove 125 into communication with the groove 114— and cause the air motor to rotate in a reverse direction. This rotation will be appreciated to be one which aids the rotation of the reel in an unwinding direction, but not one which causes the cable to pay off at a more rapid rate than the rate of translation of the vehicle 1, for if the latter condition occurred, it will be obvious that the arm 47 would return to a position in which fluid supply in a reversing direction would be interrupted.

Now if the vehicle 1 is stopped, cable tension will be so reduced that the spring 60 will pull the arm 47 back towards the position shown in Fig. 3, and accordingly, the valve 120 will again return to a position where it will simply maintain a reduced tension on the cable. If the vehicle 1 is started to the left in Fig. 1, the tension on the cable will be reduced, and then the spring 60 will move the arm 47 clockwise, and the air motor will be rotated in a direction to reel in the cable rapidly.

Any other operating conditions can be readily visualized from those which have been described. It will be evident, as above explained, that the valve 120 may be released from connection with the automatic control linkage so that the motor 33 can be controlled by hand, and thus wind up the cable at any time, or rotate the reel in an unwinding direction so that an attendant desiring to pull cable off the reel may do so readily.

It will be evident that I have provided an improved drive and control means for a cable reel, one which is simple in construction, strong and durable, effective to meet various operating conditions utilizing a small number of parts, and employing units of proven effectiveness and durability.

While there is in this application specifically described one form which the invention may assume in practice, it will be understood that this form of the same is shown for purposes of illustration and that the invention may be modified and embodied in various other forms without departing from its spirit or the scope of the appended claims.

What I claim is:

1. In a cable reeling mechanism for supplying power to a vehicle, a winding reel adapted to have a cable wound thereon, a reversible motor for driving said reel having driving connections with the latter such that when one is rotated a material amount the other is turned also, means for supplying power to said motor to effect its rotation selectively in opposite directions including an element movable to different positions to effect motor rotation in such opposite directions, and means for controlling the position of said element controlled by the tension of said cable, said driving connections including a flexible element, and said first mentioned element having shifting means for moving it from one to another of said different positions and controlled by the tension of said flexible element.

2. In a cable reeling mechanism for supplying power to a vehicle, a winding reel adapted to have a cable wound thereon, a reversible motor for driving said reel having driving connections with the latter such that when one is rotated a material amount the other is turned also, means for supplying power to said motor to effect its rotation selectively in opposite directions including an element movable to different positions to effect motor rotation in such opposite directions, and means for controlling the position of said element controlled by the tension of said cable, said driving connections including a flexible element having a portion the disposition of which changes with the tension of said cable, and said first mentioned element having shifting means for moving it from one to another of said different positions and controlled by said portion of said flexible element.

3. In a cable reeling mechanism for supplying power to a vehicle, a winding reel adapted to have a power supply cable wound thereon, a reversible motor, a sprocket rotatable with said reel, a spaced sprocket rotatable with said motor, a chain loop engaging both of said sprockets and having runs extending between its points of engagement with said sprockets both of which runs are of greater length than the straight line distances between said points, means for supplying power to said motor to effect its rotation selectively in opposite directions including an element movable to different positions to effect motor rotation in such opposite directions, and means controlled by the length of one of said runs for controlling the position of said element.

4. In a cable reeling mechanism for supplying power to a vehicle, a winding reel adapted to have a power supply cable wound thereon, a reversible motor, a sprocket rotatable with said reel, a spaced sprocket rotatable with said motor, a chain loop engaging both of said sprockets and having runs extending between its points of engagement with said sprockets both of which runs are of greater length than the straight line distances between said points, means for supplying power to said motor to effect its rotation selectively in opposite directions including an element movable to different positions to effect motor rotation in such opposite directions, and means controlled by the disposition of one of said runs for controlling the position of said element.

5. In a cable reeling mechanism for supplying power to a vehicle, a winding reel adapted to have a power supply cable wound thereon, a reversible motor, a sprocket rotatable with said reel, a spaced sprocket rotatable with said motor, a chain loop engaging both of said sprockets and having runs extending between them and of a length greater than necessary to form a snug loop engaging and connecting both sprockets, means including other sprockets engaging said runs tending yieldingly to maintain said runs of equal length, an element movable to different positions to effect rotation of said reversible motor in opposite directions, and means controlled by the position of one of said other sprockets for controlling the position of said element.

6. In a cable reeling mechanism for supplying power to a vehicle, a winding reel adapted to have a cable wound thereon, a reversible motor for driving said reel having driving connections with the latter such that when one is rotated a material amount the other is turned also, means for supplying power to said motor to effect its rotation selectively in opposite directions including an element movable to different positions to effect motor rotation in such opposite directions, and means for controlling the position of said element controlled by the tension of said cable, said driving connections including a flexible element having a portion the disposition of which changes with the tension of said cable, said first mentioned element having shifting means controlled by said portion of said flexible element, and means for manually controlling said first mentioned element wholly independently of said shifting means.

7. In a cable reeling mechanism for supplying power to a vehicle, a winding reel adapted to have a cable wound thereon, a reversible fluid motor for driving said reel having driving connections with the latter such that when one is rotated a material amount the other is turned also, fluid supply and exhaust connections for said motor, said motor having connections reversely connectable with said fluid supply and exhaust connections to effect operation of said motor in opposite directions, a reversing valve movable to vary and to reverse such connections, and means for controlling the position of said reversing valve controlled by the tension of said cable, said driving connections including a flexible element, and said valve having shifting means controlled by the tension of said flexible element.

8. In a cable reeling mechanism for supplying power to a vehicle, a winding reel adapted to have a cable wound thereon, a reversible fluid motor for driving said reel having driving connections with the latter such that when one is rotated a material amount the other is turned also, fluid supply and exhaust connections for said motor, said motor having connections reversely connectable with said fluid supply and exhaust connections to effect operation of said motor in opposite directions, a reversing valve movable to vary and to reverse such connections, and means for controlling the position of said reversing valve controlled by the tension of said cable, said driving connections including a flexible driving element disposable in different courses, and said valve having shifting means controlled by the changes in course of said flexible element.

9. In a cable reeling mechanism for supplying power to a vehicle, a winding reel adapted to have a cable wound thereon, a reversible fluid motor for driving said reel having driving connections with the latter such that when one is rotated a material amount the other is turned also, fluid supply and exhaust connections for said motor, said motor having connections reversely connectable with said fluid supply and exhaust connections to effect operation of said motor in opposite directions, a reversing valve movable to vary and to reverse such connections, and means for controlling the position of said reversing valve controlled by the tension of said cable, said driving connections including a flexible element having a portion the disposition of which changes with the tension of said cable and said valve having shifting means controlled by said portion.

10. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, and means controlled by the length of one of said runs for controlling the position of said reversing valve.

11. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, and means controlled by the disposition of one of said runs for controlling the position of said reversing valve.

12. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, an arm carrying a sprocket engaging one of said runs, and means controlled by the position of said arm for controlling the position of said reversing valve.

13. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, a sprocket engaging one of said runs, means for exerting a traction on said sprocket tending to increase the length of said run, and means controlled by the position of said sprocket for controlling the position of said reversing valve.

14. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, sprockets engaging each of said runs between their ends, means for yieldingly drawing said last mentioned sprockets towards each other, means for yieldingly drawing one of said last mentioned sprockets towards one of said first mentioned sprockets, and means controlled by the position of said one of said last mentioned sprockets for controlling the position of said reversing valve.

15. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, sprockets engaging each of said runs between their ends, means for yieldingly drawing said last mentioned sprockets towards each other, means for yieldingly drawing one of said last mentioned sprockets towards the sprocket rotatable with said reel, and means controlled by the position of said one of said last mentioned sprockets for controlling the position of said reversing valve.

16. In a cable reeling mechanism for supplying power to a vehicle, a winding reel adapted to have a power supply cable wound thereon, a reversible fluid motor, a sprocket rotatable with said reel, a spaced sprocket rotatable with said motor, a chain loop engaging both of said sprockets and having both runs thereof extending between its points of engagement with said sprockets of greater length than the straight line distances between said points, fluid supply and exhaust connections for said motor, said motor having connections reversely connectable with said fluid supply and exhaust connections to effect operation of said motor in opposite directions, a reversing valve movable to vary and to reverse such connections, sprockets engaging each of said runs between their ends, pivotally mounted arms supporting said last mentioned sprockets, means for yieldingly drawing said last mentioned sprockets towards each other, means for yieldingly drawing one of said last mentioned sprockets towards the sprocket rotatable with said reel, and means controlled by the position of the arm supporting said one of said last mentioned sprockets for controlling the position of said reversing valve.

17. In a cable reeling mechanism for supplying power to a vehicle, a winding reel adapted to have a power cable wound thereon, a reversible fluid motor for driving said reel having driving connections with the latter such that each is rotated when the other is turned a substantial amount, fluid supply and exhaust connections for said motor, said motor having connections reversely connectable with said fluid supply and exhaust connections to effect operation of said motor in opposite directions, a reversing valve movable to vary and to reverse such connections, means for controlling the position of said reversing valve controlled by the tension of said cable, and means for manually operating said valve wholly independently of said position controlling means.

18. In a cable reeling mechanism for supplying power to a vehicle, a winding reel adapted to have a power cable wound thereon, a reversible fluid motor for driving said reel having driving connections with the latter such that each is rotated when the other is turned continuously, fluid supply and exhaust connections for said motor, said motor having connections reversely connectable with said fluid supply and exhaust connections to effect operation of said motor in opposite directions, a reversing valve movable to vary and to reverse such connections, and means for automatically controlling the position of said reversing valve controlled by the tension of said cable and including a manual control element and an automatically controlled control element engageable with said manual control element and movable to interrupt such automatic control and leave said manual control element still operable to effect manual control of said reversing valve.

References Cited in the file of this patent

UNITED STATES PATENTS

| | | |
|---|---|---|
| 1,160,857 | Coseo | Nov. 16, 1915 |
| 1,892,130 | Benson | Dec. 27, 1932 |
| 1,952,504 | Lamond | Mar. 27, 1934 |
| 2,229,086 | Joy | Jan. 21, 1941 |